(12) United States Patent
Leggett et al.

(10) Patent No.: US 10,350,634 B2
(45) Date of Patent: Jul. 16, 2019

(54) METHOD FOR SMOOTHING SUBSTRATE SURFACE

(71) Applicant: Apple Inc., Cupertino, CA (US)

(72) Inventors: William F. Leggett, San Francisco, CA (US); Ming Kun Shi, San Jose, CA (US); Christopher Bruni, San Jose, CA (US); Simon Regis Louis Lancaster-Larocque, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 759 days.

(21) Appl. No.: 14/815,499

(22) Filed: Jul. 31, 2015

(65) Prior Publication Data

US 2017/0028438 A1    Feb. 2, 2017

(51) Int. Cl.
*B29C 65/00* (2006.01)
*B29C 65/02* (2006.01)
(Continued)

(52) U.S. Cl.
CPC ............ *B05D 5/00* (2013.01); *B05D 1/36* (2013.01); *B05D 3/06* (2013.01); *B29C 73/02* (2013.01);
(Continued)

(58) Field of Classification Search
CPC ....... B29C 73/00; B29C 73/02; B29C 73/025; B29C 65/48; B29C 65/72; B29C 66/40; B29C 66/41; B29C 66/87; B29C 66/90; B29C 66/02; B29C 66/022; B29C 66/0222; B29C 66/028; B29C 66/472; B29C 66/4724; B29C 66/242; B29C 66/24244; B29C 66/24221; G05B 19/18;
(Continued)

(56) References Cited

U.S. PATENT DOCUMENTS 4,156,307 A      5/1979  Dondero et al.
6,151,207 A *   11/2000  Kim ...................... G06F 1/1616
                                                                     349/58

(Continued)

FOREIGN PATENT DOCUMENTS

EP           2703149 A1       3/2014

*Primary Examiner* — Philip C Tucker
*Assistant Examiner* — Brian R Slawski
(74) *Attorney, Agent, or Firm* — Brownstein Hyatt Farber Schreck, LLP

(57) ABSTRACT

Methods for modifying contours of substrate surfaces are disclosed. Methods include depositing filler material on a critical mating surface of a substrate so as to render the mating surface more mateable with a matching substrate. The filler material can be deposited within or around features or defects on the mating surface such that a final desired surface contour is achieved. In some cases, the final surface contour of the mating surface is planar. This can prevent gaps associated with the features or defects from forming between the substrate and the matching substrate when they are joined together. The final surface contour of the mating surface can be determined by comparing dimensions of the mating surface to dimensions of a reference surface. In some cases, ink jet printing techniques are used to deposit the filler material accurately in prescribed locations and with precise thickness control.

20 Claims, 16 Drawing Sheets

(51) Int. Cl.

| | |
|---|---|
| *B32B 37/00* | (2006.01) |
| *B32B 38/00* | (2006.01) |
| *B29C 73/00* | (2006.01) |
| *B32B 43/00* | (2006.01) |
| *B32B 38/14* | (2006.01) |
| *B32B 38/04* | (2006.01) |
| *C23C 14/54* | (2006.01) |
| *B05D 3/00* | (2006.01) |
| *B05D 5/00* | (2006.01) |
| *B05D 1/36* | (2006.01) |
| *B05D 3/06* | (2006.01) |
| *B32B 37/24* | (2006.01) |
| *B32B 37/30* | (2006.01) |
| *B29C 73/02* | (2006.01) |
| *B29C 65/48* | (2006.01) |
| *B29C 73/10* | (2006.01) |

(52) U.S. Cl.
CPC .............. *B32B 37/24* (2013.01); *B32B 37/30* (2013.01); *B32B 43/00* (2013.01); *B29C 65/48* (2013.01); *B29C 66/0222* (2013.01); *B29C 66/242* (2013.01); *B29C 66/41* (2013.01); *B29C 73/10* (2013.01); *B32B 2038/0064* (2013.01); *B32B 2457/00* (2013.01)

(58) Field of Classification Search
CPC .... G05B 19/188; G05B 19/19; G05B 19/401; G05B 2219/32228; B05D 5/005; B32B 43/00; B32B 2038/0064
USPC ......... 156/58, 60, 64, 94, 98, 153, 154, 242, 156/245, 250, 267, 277, 278, 349, 350, 156/356, 357, 384, 387, 535, 272.2, 156/273.3, 275.5; 427/8, 9, 140, 256, 427/282, 289, 290, 331; 382/141, 152, 382/154; 703/1; 356/237.1; 264/40.1, 264/241, 401
See application file for complete search history.

(56) References Cited

U.S. PATENT DOCUMENTS

| | | | |
|---|---|---|---|
| 6,459,460 B1* | 10/2002 | Yamanaka ........ G02F 1/133308 349/58 |
| 6,689,222 B2 | 2/2004 | Titel et al. |
| 9,082,209 B1* | 7/2015 | Engelbart ............... G06T 11/00 |
| 2003/0046849 A1* | 3/2003 | Lin .................... G02F 1/133308 40/792 |
| 2004/0236454 A1* | 11/2004 | Weisser ................. B29C 65/52 700/123 |
| 2006/0034041 A1* | 2/2006 | Lo ......................... G06F 1/1601 361/679.21 |
| 2011/0058117 A1* | 3/2011 | Ogatsu ................ H04M 1/0202 349/58 |
| 2011/0087352 A1* | 4/2011 | Krause ................... B23P 6/002 700/98 |
| 2011/0156352 A1 | 6/2011 | Bond et al. |
| 2012/0024475 A1* | 2/2012 | Kitajima ............. B29C 65/4825 156/312 |
| 2012/0179285 A1* | 7/2012 | Melzer-Jokisch ...... B23P 6/007 700/164 |
| 2013/0074765 A1* | 3/2013 | Heylen .................... B41J 3/407 118/323 |
| 2013/0238111 A1* | 9/2013 | Whipple .......... G05B 19/41875 700/110 |
| 2014/0111927 A1* | 4/2014 | Raff ..................... G06F 1/1637 361/679.21 |
| 2014/0234530 A1 | 8/2014 | Frankenberger |
| 2016/0159011 A1* | 6/2016 | Marchione ........... B29C 64/386 700/98 |

\* cited by examiner

METHOD FOR SMOOTHING SUBSTRATE SURFACE

FIELD

The described embodiments relate generally to methods for smoothing surfaces of substrates. More particularly, the present embodiments relate to creating mateable surfaces by depositing material in or around surface defects of substrates.

BACKGROUND

Cutter marks, scratches, pits, dents or other surface defects are very common in the manufacturing of parts. Some of the surface defects are related to the handling of the parts during the manufacturing process. Some surface defects are related to the machining process itself. For example, a manufacturing tool and/or part can shift during a machining operation, causing unintended marks or inconsistencies on the surface of the part. Some surface defects are related to manufacturing tolerances that are inherent to the machining process. In some cases, certain materials, such as soft, malleable or brittle materials, can be especially susceptible to acquiring certain types of surface defects.

One of the problems associated with surface defects relates to the manufacture of mating components of a part. In particular, surface defects can cause uneven mating surfaces of matching parts. For example, a cutter tool can create divots or channel shaped defects that are sub-flush to surrounding surfaces. These divots or channels can prevent intimate contact between mating surfaces, which in turn can lead to formation of a noticeable gap between the mating components, adversely affecting the cosmetic appearance of the part. In addition, this can lead to poor sealing and poor adhesion of the mating components, which negatively affects the reliability and functionality of the part. These defects, if not repaired, may also be carried forward and cause processing problems or failures in later manufacturing stages.

SUMMARY

This paper describes various embodiments that relate to manufacturing techniques for forming smooth mating surfaces on parts. In particular embodiments, non-contact additive processes, such as printing techniques or robot-controlled needle dispensing techniques, are used to precisely deposit material in and/or around surface defects so as to form consistently smooth surfaces for mating with corresponding parts.

According to one embodiment, a method of adjusting a surface of a substrate is described. The method includes comparing a contour of the surface to a reference contour of a reference surface. The method also includes, based upon the comparing, identifying a portion of the surface having a corresponding surface contour that is out of conformance with respect to the reference contour as: (1) a bump when the corresponding surface contour is proud of the reference contour, otherwise (2) as a divot. The method further comprises bringing the corresponding surface contour of the identified portion into conformance by: depositing a first amount of filler material in a region around the bump, otherwise, depositing a second amount of filler material into the divot.

According to another embodiment, a method of modifying a mating surface of a substrate is described. The mating surface is arranged to bond with an inlay. The method includes comparing a shape of the mating surface to a shape of a reference surface of the substrate. The reference surface is associated with an external surface of the substrate. The method also includes depositing a filler material on the mating surface such that the mating surface takes on the shape of the reference surface. When the inlay is bonded to the mating surface, an external surface of the inlay is substantially flush with the external surface of the substrate.

According to a further embodiment, a method of modifying a housing is described. The substrate has a perimeter defined by a lip portion defining dimensions of an opening for accommodating a cover glass. The method includes obtaining dimensional data related to the housing. The method also includes depositing a filler material on a surface of the lip portion so as to decrease the dimensions of the opening in accordance with the dimensional data of the cover glass.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
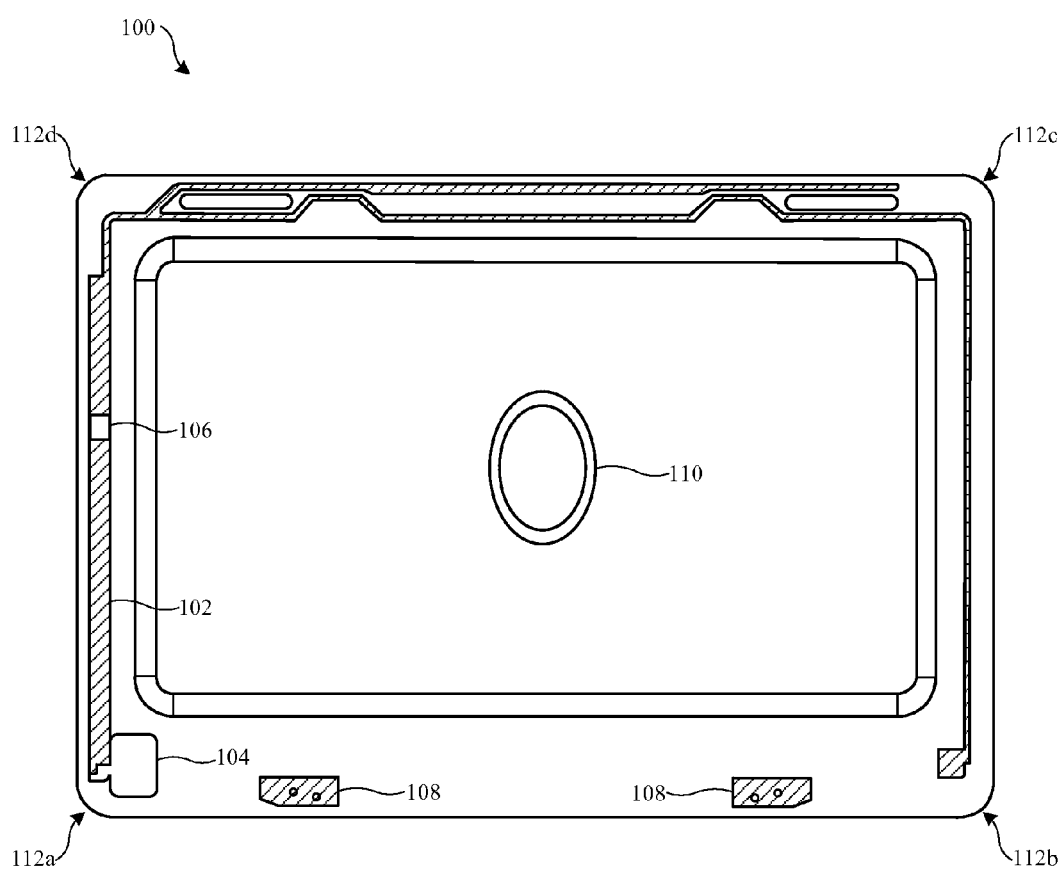
FIG. 1 shows an internal surface of a housing section of a consumer device having mating surfaces.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to depositing filler material on a surface of a part to modify surface qualities such as the smoothness of the surface. The methods can be used to smooth out defects within surfaces of the part formed, for example, during previous machining or other manufacturing operations. The defects can be in the form of cutter mismatch regions, cutter marks, scratches, dents, or pits. The methods are particularly useful for creating better mating surfaces between two or more matching parts that are to be coupled together. The smoother mating surfaces can create a better wetting surface for applying adhesives and reduce the occurrence of undesirable gaps between the matching parts.

The size of the defects can vary widely. For example, the defects can be very small, e.g., on the scale of micrometers, or relatively large, e.g., on the scale of millimeters or even centimeters. In addition, the types and shapes of the defects can vary. For example, the defects can have sharp or irregular corners and edges, can protrude from or recede within a surface of a part, or can simply be a gradual non-planar section of the part. Thus, in particular embodiments, the methods involve continuously adapting the depositing process to accommodate different defect types and shapes. For example, the filler material can be deposited in an additive manner providing for precise dimension control.

In particular embodiments, the methods involve precise control of depositing filler material using non-contact additive processes. Suitable non-contact processes can include ink jet printing techniques where the filler material is ejected in small droplets. In some embodiments, a robot-controlled needle dispensing technique is used. In some embodiments, the filler material is an ink material, such as a polymer-based ink. The printed-on filler material can be deposited in a single pass or in incremental layers resulting in a substantially smooth surface across the surface of the part. The printed-on filler material can also correct for manufacturing tolerances or intentional features that may be an inherent consequence of a manufacturing process. The printed-on filler material can also be deposited in select regions to strengthen a part, particularly during a manufacturing process.

In a particular embodiment, a method of detecting and correcting defects is disclosed. The method involves inspecting the surface of the part for defects using, for example, an optical imaging, a laser scanning, and/or a profilometry. In some cases, two- or three-dimensional data of the surface is collected. The surface may be a planar surface or a curved surface. The defects can then be analyzed to determine if the defects have correctable dimensions. If correctable, the surface can be modified by precisely depositing filler material in or around the defects. If the defect is recessed, such as a scratch or a dent, the filler material can be precisely printed into the recess either in multiple layers or in a single pass, resulting in a substantially planar surface across the surface of the part. If the defect is a protrusion, filler material can be precisely deposited adjacent to the protrusion continuously or in stepped layers, resulting in a smooth transition from the surface of the part to the top of the protrusion. If the part contains multiple defects, the modification process can be repeated for each of the correctable defects. The surface modifications can then be inspected to ensure that the modifications are within allowable tolerances. A scanning inspection may be used to create a map of the modified surface, and the modifications can be compared against acceptable tolerances. The tolerances may include surface smoothness and planarity across the modification, adhesion of the filler material to the part, and color matching to the surface of the part. The part can also be reworked if the modifications are not acceptable.

Methods described herein are well suited for providing cosmetically appealing and/or functional parts of consumer products. For example, the methods described herein can be used to modify support structures and enclosures or portions of enclosures for electronic devices, such as computers, portable electronic devices, wearable electronic devices and electronic device accessories, such as those manufactured by Apple Inc., based in Cupertino, Calif.

These and other embodiments are discussed below with reference to FIGS. 1-11. However, those skilled in the art will readily appreciate that the detailed description given herein with respect to these Figures is for explanatory purposes only and should not be construed as limiting.

FIG. 1 shows a front view of an internal surface of housing section 100 of a consumer device. Housing section 100 can correspond to a portion of a housing for an electronic device, such as a portable computer, such as a laptop computer. Housing section 100 can be made of any suitable material, such as one or more of metal, plastic, ceramic, and glass materials. In a particular embodiment, housing section 100 is made of a continuous metal material, such as aluminum or aluminum alloy, which gives housing section 100 a seamless and continuous look and feel. In addition, metal material can make housing section 100 heat conductive, and therefore can act to disperse heat generated from electronic components housed within housing section 100. In some embodiments, an electrical conductivity of the metal material allows for grounding for one or more of the electrical components.

Housing section 100 includes mating surface 102 (indicated with hatch marks) that is configured to mate with a corresponding second housing section (not shown) to enclose one or more electronic components. Mating surface 102 can be formed using one or more machining operation, such as computer numerical code (CNC) machining operations. Housing section 100 can be secured to the corresponding second housing section using fasteners, such as screws, bolts, etc. In some embodiments, adhesive is applied between housing section 100 and the corresponding second housing section at mating surface 102 to provide a sealed coupling between housing section 100 and corresponding second housing section. In some embodiments, mating surface 102 is optimally planar so as to provide good bonding with the adhesive and proper sealing with the corresponding housing section.

Mating surface 102 may include a number of areas that are uneven due to imperfect machining processes. For example, bump 106 may protrude a small distance from mating surface 102. Furthermore, protruding features 108 may each have a sloped top surface that are not coplanar with mating surface 102. These types of discrepancies can cause non-ideal mating and sealing of housing section 100 with the corresponding second housing section. Housing section 100 can include a number of other non-ideally shaped surfaces. For example, recessed feature 104 at corner region 112a of housing section 100 may be unintentionally formed due to imperfect machining processes. In some embodiments, an overall shape of housing section 100 is embodied as a reference datum where parts of mating surface 102 are used as a reference surface characterized as having a reference contour. This will be described later below. Additionally, inlay region 110 may have an uneven mating surface with respect to a corresponding inlay.

The methods described herein involve depositing filler material onto housing section 100 to correct for non-ideally shaped surfaces, such as recessed feature 104, bump 106, protruding features 108, and inlay region 110. In some embodiments, housing section 100 is translated in two or three dimensions with respect to a deposition apparatus in order to deposit filler material onto each of recessed feature 104, bump 106, protruding features 108, and inlay region 110. In some embodiments, a portion of the deposition apparatus (e.g., printer head or nozzle) is translated in two or three dimensions with respect to housing section 100 in order to deposit filler material onto each of recessed feature 104, bump 106, protruding features 108, and inlay region 110. The methods described herein can also be used to deposit filler material on or in intentionally formed features of housing section 100. For example, some features can be formed near corner regions 112a, 112b, 112c, 112d to increase the structural integrity of housing section 100 near corner regions 112a, 112b, 112c, 112d. These and other embodiments will be described in detail below.

Figure 2A:
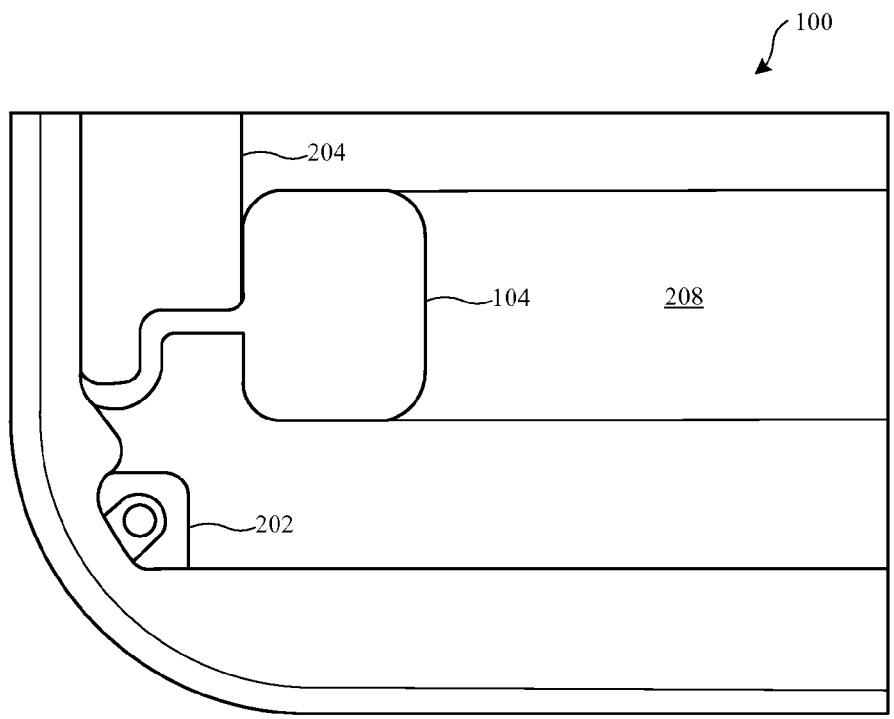
FIGS. 2A-2G show a portion of the housing section of FIG. 1 having a recessed feature undergoing a surface modification process.
Figure 2B:
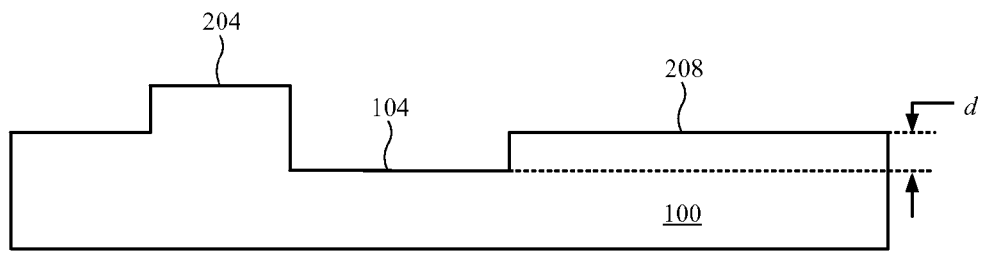

FIGS. 2A and 2B show a front view and a cross section view, respectively, of recessed feature 104 of housing section 100. Recessed feature 104 can be referred to as a divot, trench, dent, depression, pit, etc. Housing section 100 includes two recessed features, recessed feature 104 and second recessed feature 202. Note that the cross section view of FIG. 2B shows a cross section view of recessed feature 104 but not second recessed feature 202. Recessed features 104 and 202 can be unintentionally formed artifacts of a machining process or can be intentionally formed within housing section 100. In some embodiments, recessed features 104 and 202 are undesirable features formed within housing section 100 due to imperfect machining processes. For example, recessed features 104 and 202 can be formed due to mismatching of cutters used in a machining process. Recessed features 104 and 202 generally have very small depths. For example, recessed feature 104 can be sub-flush to surrounding surfaces by a distance d of about 50 micrometers or less.

Figure 2C:
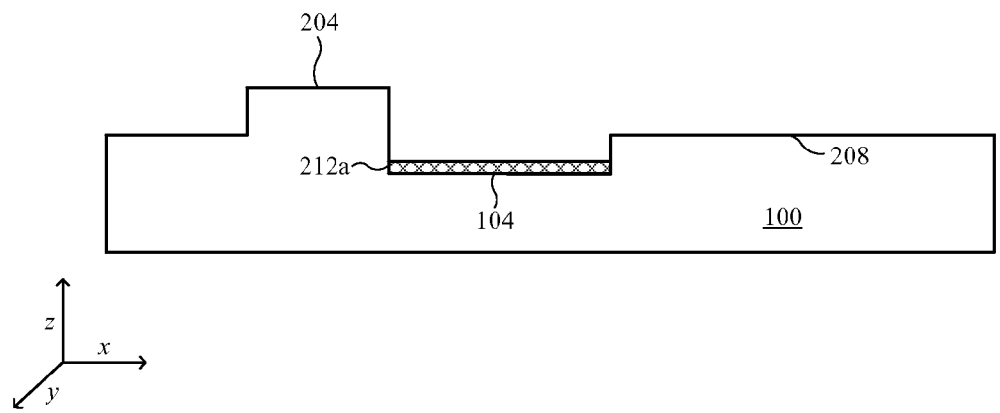

The methods described herein can be used to fill in recessed features 104 and 202 such that they are no longer sub-flush with surrounding surfaces. To illustrate, FIGS. 2C-2F show cross section views of recessed feature 104 undergoing a surface smoothing process in accordance with some embodiments. FIG. 2C shows recessed feature 104 after first layer 212a of filler material is deposited within recessed feature 104. In some embodiments, first layer 212a is deposited using an ink jet printing process whereby the filler material is ejected from a nozzle in small droplets. This can provide accurately location (xy) and thickness (z) of first layer 212a. For example, one or more nozzles of an ink jet type printer can be scanned or passed over recessed feature 104 to selectively deposit first layer 212a within recessed feature 104 without significant deposition on raised mating surface 204 and/or channel 208. In a particular embodiment, an adjustable X-Y translation stage is attached to a printer table of the printer in order to obtain accurate depositing of the filler material.

The filler material of first layer 212a can be any suitable material. For example, the filler material can be an ink. The ink can be selected for desirable characteristics such as adhesion to housing section 100, adhesion to a subsequently added adhesive, the integrity of the ink once deposited, the viscosity of the ink, color and/or electrical conductivity. The consistency and viscosity of the ink can be chosen to provide a particular purpose. For example, the ink can include a binder material that increases the viscosity and provides volume to first layer 212a. In one embodiment, the binder material includes transparent (clear) or partially transparent ink. In some embodiments, the filler material of first layer 212a also includes one or more dyes that give first layer 212a a particular color, such as black. In some embodiments, the ink is substantially non-electrically conductive while in other embodiments the ink is electrically conductive. The ink can be a polymer-based ink suitable for use with an ink jet printer. The ink may be an ultraviolet (UV) curable ink, where the ink is deposited in liquid form and then hardened by exposure to UV light once deposited on housing section 100. In some embodiments, the volume of deposited ink does not change during curing of the ink. Alternatively, the ink may be a solvent ink where the volume of ink decreases during the curing of the ink. In some embodiments, first layer 212a has a viscosity that is low enough to allow first layer 212a to conform to a shape of recessed feature 104 while in liquid form, and remain in the conformal shape once hardened into solid state. The thickness of first layer 212a can vary depending on the material of the filler material, the size of the droplets formed by the ink jet printer and a desired thickness of first layer 212a. In one embodiment, the thickness of first layer 212a ranges from about 5 and 10 micrometers.

Figure 2D:
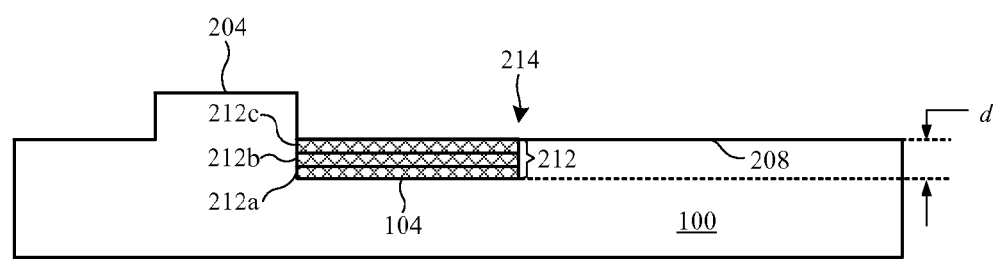

FIG. 2D shows recessed feature 104 after multiple layers 212a, 212b, 212c of filler material have been sequentially deposited within recessed feature 104. Collectively, layers 212a, 212b, 212c can be referred to as filler material 212. Layers 212a, 212b, 212c can be deposited by passing or scanning the nozzle of the ink jet printer over recessed feature 104 a number of times, with a layer of filler material being deposited with each pass. In some embodiments, each of layers 212a, 212b, 212c is allowed to conform while in liquid form to the walls of recessed feature 104 and hardened. The number of layers 212a, 212b, 212c can be chosen such that a final thickness of filler material 212 is about the same as distance d that recessed feature 104 recesses below the adjacent surface of channel 208. That is, a top surface of filler material 212 can be substantially flush with a top surface of adjacent channel 208. In this way, top surfaces of filler material 212 and channel 208 can cooperate to form a substantially planar mating surface 214.

The number of layers 212a, 212b, 212c required to make mating surface 214 substantially planar can vary depending on the thickness of each layers 212a, 212b, 212c. In some embodiments, filler material 212 includes only one layer. In some embodiments, each of layers 212a, 212b, 212c has about the same thickness, while in other embodiments, the thickness of each of layers 212a, 212b, 212c vary. Since the thicknesses of each of layers 212a, 212b, 212c is small compared to thickness d of recessed feature 104, this makes it easier to achieve a mating surface 214 that is flush, or very close to flush, with the top surface of adjacent channel 208.

In some embodiments, dimensional data is collected with regard to the planarity of mating surface 214 using, for example, optical imaging, a laser scanning, and/or a profilometry techniques. The dimensional data can be two-dimensional data or three-dimensional data. Such dimensional data can be collected, stored and processed using an electronic system, such as the electronic system described in detail below with reference to FIG. 11. If it is determined that mating surface 214 is planar in shape within a threshold amount (e.g., 5 micrometer surface variation or less) mating surface 214 can be deemed planar enough. If, however, mating surface 214 is not within the threshold amount of planarity, more layers of filler material 212 can be added or housing section 100 can be reworked to remove some of filler material 212. Since layers 212a, 212b, 212c nominally have very small thicknesses and can be added sequentially, it is more likely that an acceptably planar mating surface 214 can be achieved without needing to rework housing section 100.

Figure 2E:
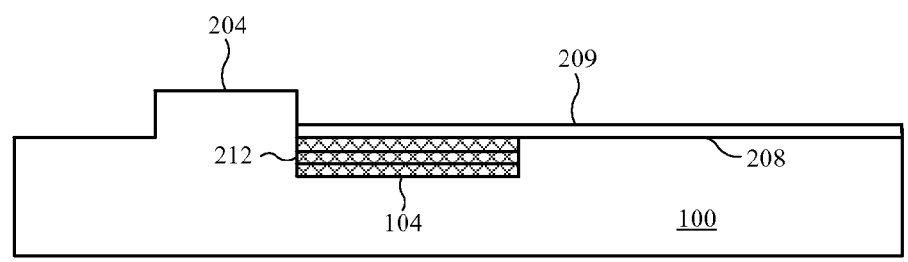

At FIG. 2E, adhesive 209 is applied onto mating surface 214. Adhesive 209 can be a liquid adhesive or an adhesive tape. In some embodiments, adhesive 209 is a polymer-based adhesive or silicon-based adhesive. In some embodiments, adhesive 209 provides watertight sealing capability. Since mating surface 214 is substantially planar, this increases wetting of adhesive 209 when applied to mating surface 214. That is, making mating surface 214 substantially planar increases the surface energy of mating surface 214 compared to the surface energy of adhesive 209, thereby providing increased wetting of adhesive 209. The planar shaped mating surface 214 also reduces or eliminates any gaps that can hinder the bonding of adhesive 209 to mating surface 214. That is, filler material 212 creates a smooth mating surface 214 for adhesive 209 to bond with. It has been found that adhesives can allow for about 10% variation in surface flatness relative to the thickness of the adhesives. Thus, a 50 micrometer thick adhesive requires less than 5 micrometer surface variation. Filler material 212 helps achieve this by filling in recessed feature 104. The smoother mating surface 214 achieved using filler material 212 also allows adhesive 209 to be thinner than if filler material 212 were not used. In particular, adhesive 209 would have to be thick enough to fill in recessed feature 104. In cases where adhesive 209 has a fixed thickness, such an adhesive tape, adhesive 209 may not be able to adequately fill recessed feature 104, thereby weakening the adhesion of adhesive 209 to housing section 100. Note that in some embodiments, adhesive 209 includes multiple layers of adhesive material.

Figure 2F:
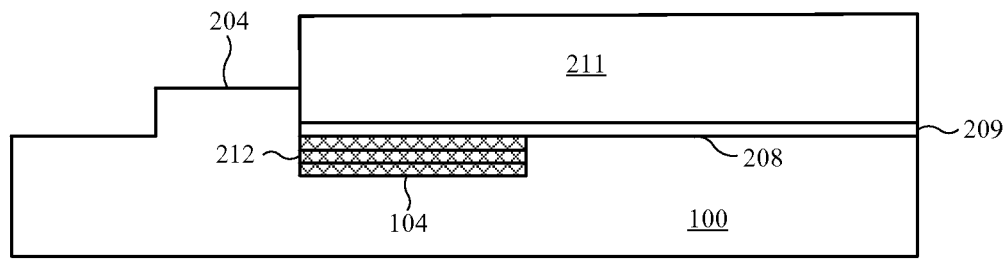

At FIG. 2F, part 211 is positioned onto adhesive 209. Part 211 can be another section of housing, or can be an internal component that is housed within the larger housing structure. Since adhesive 209 is strongly bonded to housing section 100, part 211 is also strongly bonded to housing section 100. Furthermore, since filler material 212 fills in recessed feature 104, there are no gaps between housing section 100 and part 211 for contaminants to become deposited or that can reduce the adhesion integrity between housing section 100 and part 211. Such gaps may also be cosmetically unappealing if noticeable by a user. In addition, such gaps may also allow light to leak between housing section 100 and part 211, which may be aesthetically unappealing.

Figure 2G:
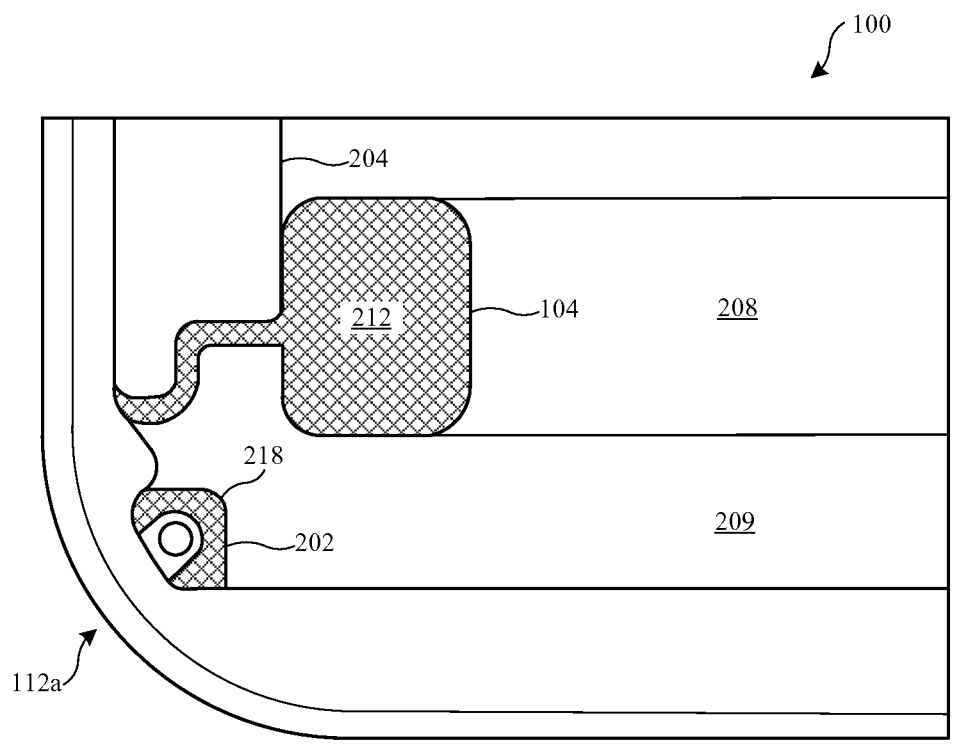

FIG. 2G shows a front view of a portion of housing section 100 after depositing filler material 212 and 218 in recessed features 104 and 202, respectively. Each of filler material 212 and 218 can be formed of multiple thin layers deposited using the ink jet printing techniques described above, thereby providing accurate depositing and thickness control of filler material 212 and 218. For example, the thickness of filler material 218 can be chosen such that the top surface of filler material 218 is substantially flush with the surface of adjacent channel 208.

Another potential benefit to adding filler material 212 and 218 to housing section 100 is that filler material 212 and 218 can add structural integrity to corner region 112a of housing section 100. As consumer electronic devices become thinner, the housings, such as housing section 100, are becoming correspondingly thinner. The thinner housing walls of housing section 100 may not have enough stiffness to resist bending and flexing during further manufacturing processes that housing section 100 undergoes. For example, if housing section 100 is made of a metal material such as aluminum alloy, corner region 112a can be susceptible to bending or flexing, especially if housing section 100 is thin. Thus, filler material 212 and 218 can act as stiffeners that stiffen corner region 112a, thereby making corner region 112a less susceptible to this bending or flexing. In this way, housing section 100 can maintain its shape during subsequent manufacturing processes. The material of filler material 212 and/or 218 can be chosen to provide a certain stiffness. For example, filler material 212 and/or 218 can be made of a stiff polymer ink, such as certain UV curable polymer inks. In some embodiments, corner regions 112b, 112c, 112d of housing section 100 also include corresponding filler materials to stiffen all four corners of housing section 100.

Figure 3A:
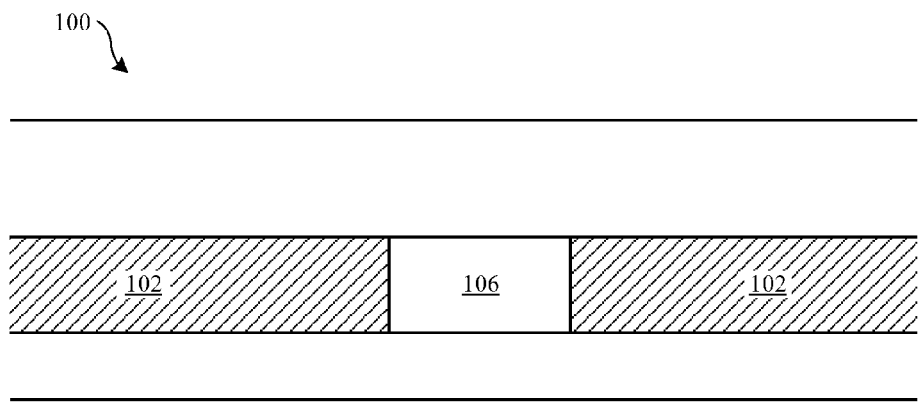
FIGS. 3A-3E show a portion of the housing section of FIG. 1 having a protruding feature undergoing a surface modification process.
Figure 3B:
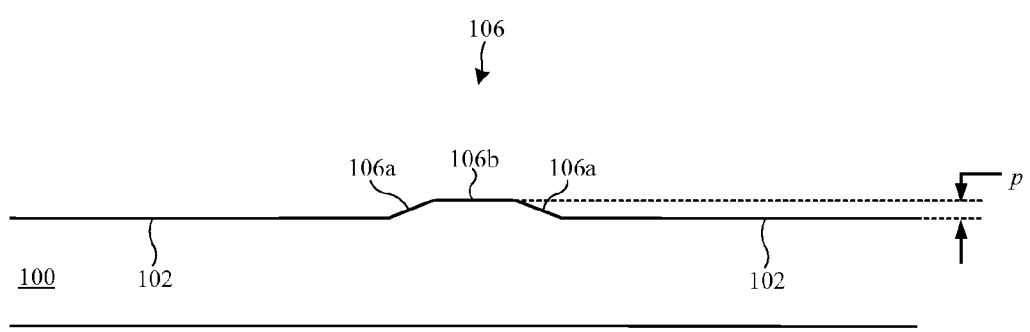

Methods described herein can also be used to smooth out protruding features. To illustrate, FIGS. 3A and 3B show a front view and a cross section view, respectively, of bump 106 that is formed on mating surface 102 of housing section 100. Bump 106 can be an unintentionally formed artifact from a machining process or an intentionally formed feature. Bump 106 protrudes a distance p from mating surface 102. That is, bump 106 is proud of mating surface 102. Distance p can be very small, e.g., about 15 micrometers. Bump 106 includes tapered surfaces 106a that protrude a distance less than top surface 106b of bump 106. Even though bump 106 is generally small, it can negatively affect the adhesion capability of mating surface 102. In particular, an adhesive may not conform well to the shape of bump 106, which can in turn reduce the adhesion capability of the adhesive.

Figure 3C:
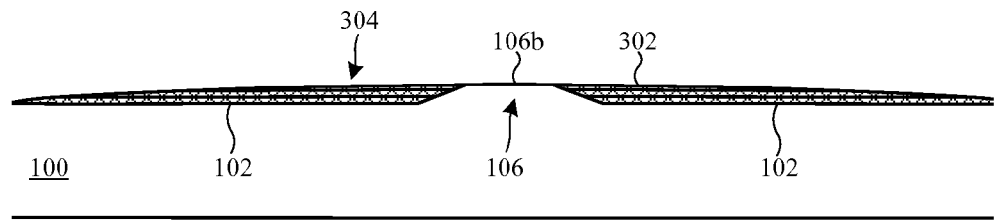
Figure 3D:
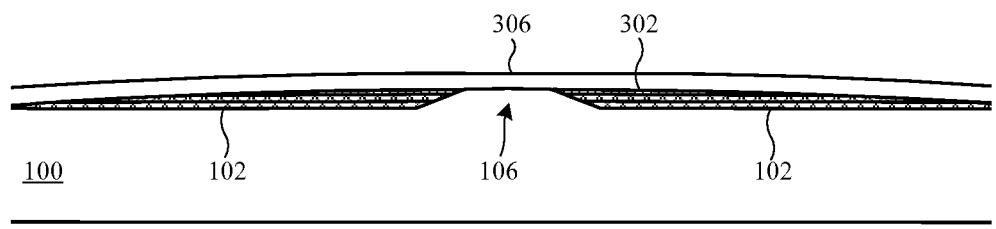
Figure 3E:
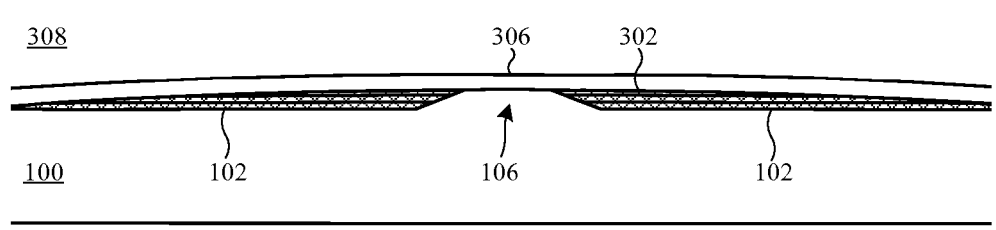

FIGS. 3C-3E show cross section views of bump 106 undergoing a substrate smoothing process in accordance with some embodiments. FIG. 3C shows housing section 100 after filler material 302 is deposited on mating surface 102 adjacent to bump 106. In some embodiments, filler material 302 does not cover top surface 106b of bump 106, while in other embodiments a portion of filler material 302 covers top surface 106b of bump 106. Filler material 302 can be made of any suitable material and can be deposited using any suitable technique in order to create a more planar overall mating surface 304. That is, filler material 302 smoothes out and makes bump 106 less prominent. In some embodiments, filler material 302 is an ink and is deposited using an ink jet printing process. The viscosity and color of filler material 302 can vary depending on design needs, as described above. In some embodiments, the filler material is viscous enough to conform to the shape of bump 106, and then harden in a final conformed shape. For example, a UV light sensitive filler material 302 can be exposed to UV light to harden after filler material 302 has suitably conformed to the shape of bump 106.

Filler material 302 can be deposited in layers, as described above with reference to FIGS. 2C and 2D. This can provide the extra control needed to provide a substantially planar mating surface 304. For example, a first layer of filler material 302 can be deposited in liquid form and allowed to conform to the shape of bump 106. Then the first layer of filler material 302 can be allowed to harden either by air drying or by UV light exposure. Subsequent layers of filler material 302 are then deposited using the similar procedures until filler material 302 takes on a final shape that evens out bump 106 and provides a substantially planar mating surface 304. Since the layers of filler material 302 can be deposited in very small thicknesses at a time, e.g., 5 to 10 micrometer increments, this allows for better shape conformity around bump 106.

The planarity of mating surface 304 can be determined by collecting two-dimensional data or three-dimensional data as described above. In some embodiments, the dimensional data of mating surface 304 is compared to dimensional data of a reference surface. For example, returning back to FIG. 1, dimensional data of another portion along mating surface 102 can be collected and used as a reference or target surface. The dimensional data can correspond to a contour or profile of the reference surface. It may be important for all portions along mating surface 102, including over bump 106, to have a coplanar shape and orientation such that all points along mating surface 102 can match with a corresponding planar mating surface of a second housing section. Thus, a target can be for mating surface 214 to be coplanar with remaining portions of mating surface 102.

FIG. 3D shows housing section 100 after adhesive 306 is applied onto mating surface 304. Filler material 302 makes mating surface 304 substantially planar, thereby allowing adhesive 306 to create a better bond with mating surface 304. FIG. 3E shows housing section 100 after part 308 is positioned on adhesive 306. In some embodiments, part 308 is another housing section that mates with housing section 100 to form a housing for an electronic device. In some embodiments, part 308 is an internal component that is housed within a larger housing structure. Since adhesive 306 is strongly bonded to housing section 100, part 308 is also strongly bonded to housing section 100. Furthermore, since filler material 302 surrounds bump 106, there are no gaps between housing section 100 and part 308. Specifically, without filler material 302, a gap could form between adhesive 306 and housing section 100 around bump 106, which means adhesive 306 could be less securely bonded with housing section 100. In some embodiments adhesive 306 can be made of a material sufficient to provide a moisture resistant seal between housing section 100 and part 308. Thus, the elimination of such gap can be important to assure the integrity of such moisture resistant seal. In addition, such a gap could be an entry point for debris and contaminants that would eventually weaken the bonding of adhesive 306 to housing section 100. Such gap could also be noticeable to a user of the final product and negatively affect the cosmetic appearance of the product. In addition, such gap could also allow light to leak between housing section 100 and part 308. This can be especially important if bump is positioned proximate to a display screen of the electronic device. In particular, light leakage around a display screen can interfere with the quality of the display screen.

Figure 4A:
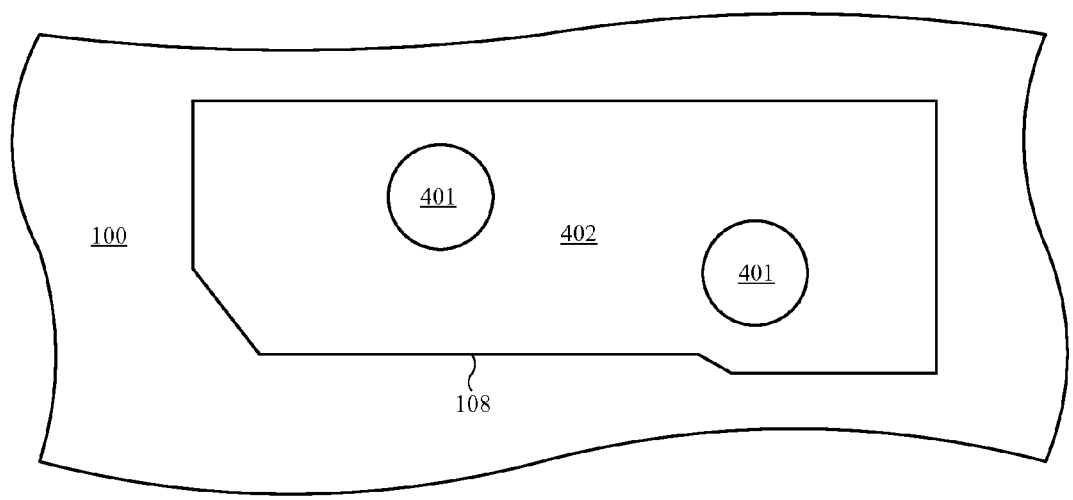
FIGS. 4A-4D show a portion of the housing section of FIG. 1 having a different protruding feature undergoing a surface modification process.
Figure 4B:
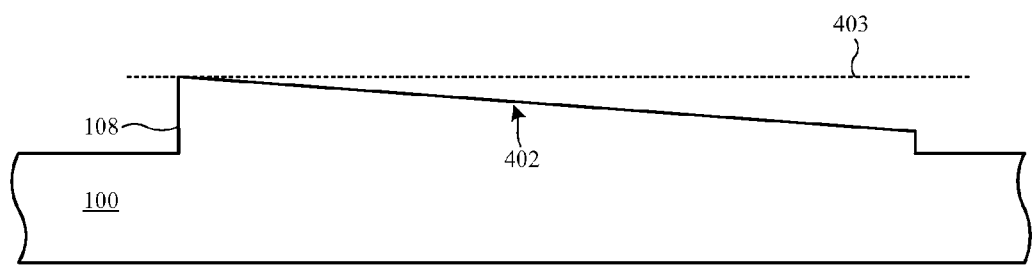

FIGS. 4A and 4B show a front view and a cross section view, respectively, of a portion of housing section 100 with protruding feature 108. In some embodiments, protruding feature 108 includes openings 401 for accommodating fasteners. Mating surface 402 of protruding feature 108 can be configured to mate with a surface of a corresponding second housing section. Thus, mating surface 402 of protruding feature 108 is ideally coplanar with mating surface 102 shown in FIG. 1. Note that mating surface 402 is non-contiguous with mating surface 102. However, both mating surface 402 and mating surface 102 can be mated with a corresponding second housing section. The shape and orientation of mating surface 102 with respect to mating surface 402 can be represented as reference contour 403 (or reference plane 403). Reference contour 403 can be acquired by obtaining three-dimensional mapping data of mating surface 102 using techniques such as those described above. Dimensional data can also be taken of mating surface 402 of protruding feature 108, and compared to reference contour 403 to determine the difference between the two. This difference corresponds to the area of filler material required to bring top surface 402 in co-planar alignment with mating surface 102.

It can be important for mating surface 402 to be coplanar with mating surface 102 in order to provide proper mating and sealing with the second housing section. However, mating surface 402 is sloped relative to reference contour 403. This sloping can cause a gap to form between housing section 100 and the corresponding second housing section when they are joined together. As described above, such gaps can be noticeable and detract from the cosmetic appeal of a final product. Debris can also get trapped in these gaps and/or light can leak the gaps.

Figure 4C:
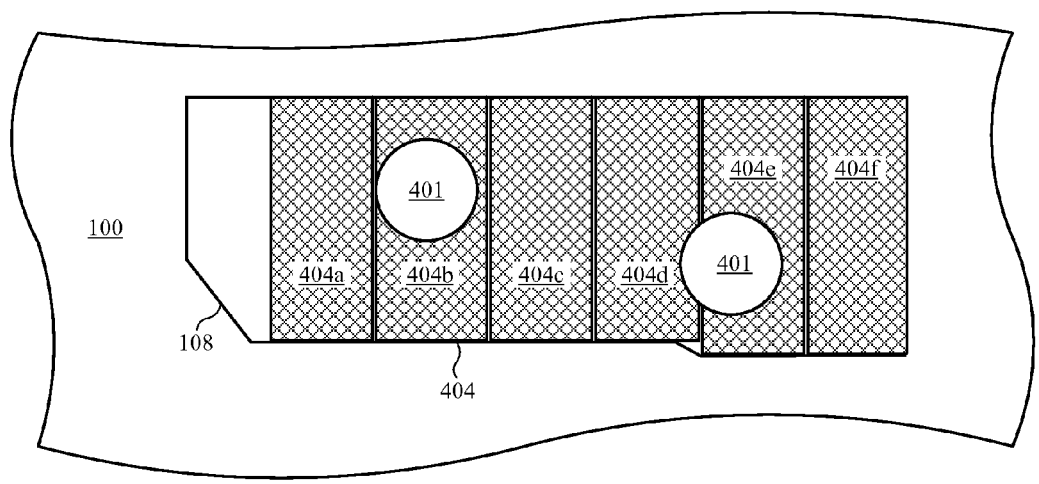
Figure 4D:
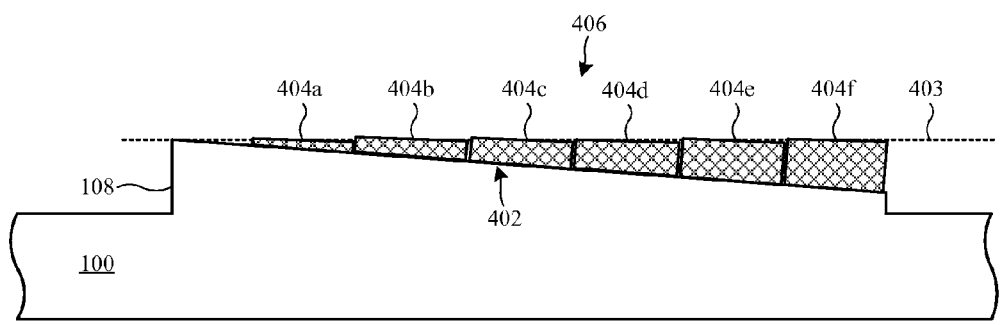

FIGS. 4C and 4D show a front view and a cross section view, respectively, of protruding feature 108 after undergoing a surface filling process, in accordance with some embodiments. FIG. 4C shows filler material 404 deposited onto protruding feature 108 in sections 404a, 404b, 404c, 404d, 404e, 404f that are progressively thicker so as to provide a mating surface 406 that is substantially co-planar with reference contour 403. In particular, section 404a is thinnest and section 404f is thickest, in accordance with sloped surface 402 of protruding feature 108. Since reference contour 403 is coplanar with mating surface 102, mating surface is substantially coplanar with mating surface 102. In another words, sloped surface 402 is brought into conformance in a stepwise fashion by depositing filler material 404 on sloped surface 402 in accordance with reference contour 403. In this way, filler material 404 can be referred to as a shim. Thus, a second housing section will be more securing mated with housing section 100.

The thickness of each of sections 404a, 404b, 404c, 404d, 404e, 404f of filler material 404 can be controlled using the multilayered printing techniques described above. For example, one or a few layers of ink can be deposited to form thinnest section 404a, while multiple layers of ink can be deposited to form thickest section 404f. The precise printing methods can also assure that filler material 404 is deposited only on protruding feature 108 and not on other surfaces of housing section 100 or within openings 401, which may be used to accommodate fasteners.

It should be noted that FIGS. 4C and 4D illustrate only one configuration of a filler material 404 and that other configurations could be used to form mating surface 406 that is substantially co-planar with reference contour 403. For example, a continuous filler material, instead of sections 404a, 404b, 404c, 404d, 404e, 404f of filler material 404, can be deposited. In addition, since the printing process can provide accurate deposition control, sections 404a, 404b, 404c, 404d, 404e, 404f can have any suitable shape, such as sections that run lengthwise with respect to protruding feature 108 or concentrically arranged sections.

Figure 5A:
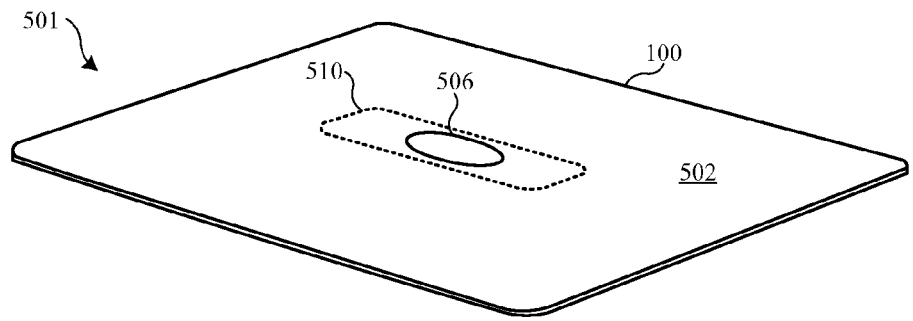
FIGS. 5A-5E show a portion of the housing section of FIG. 1 having a recessed inlay region undergoing a surface modification process.
Figure 5B:
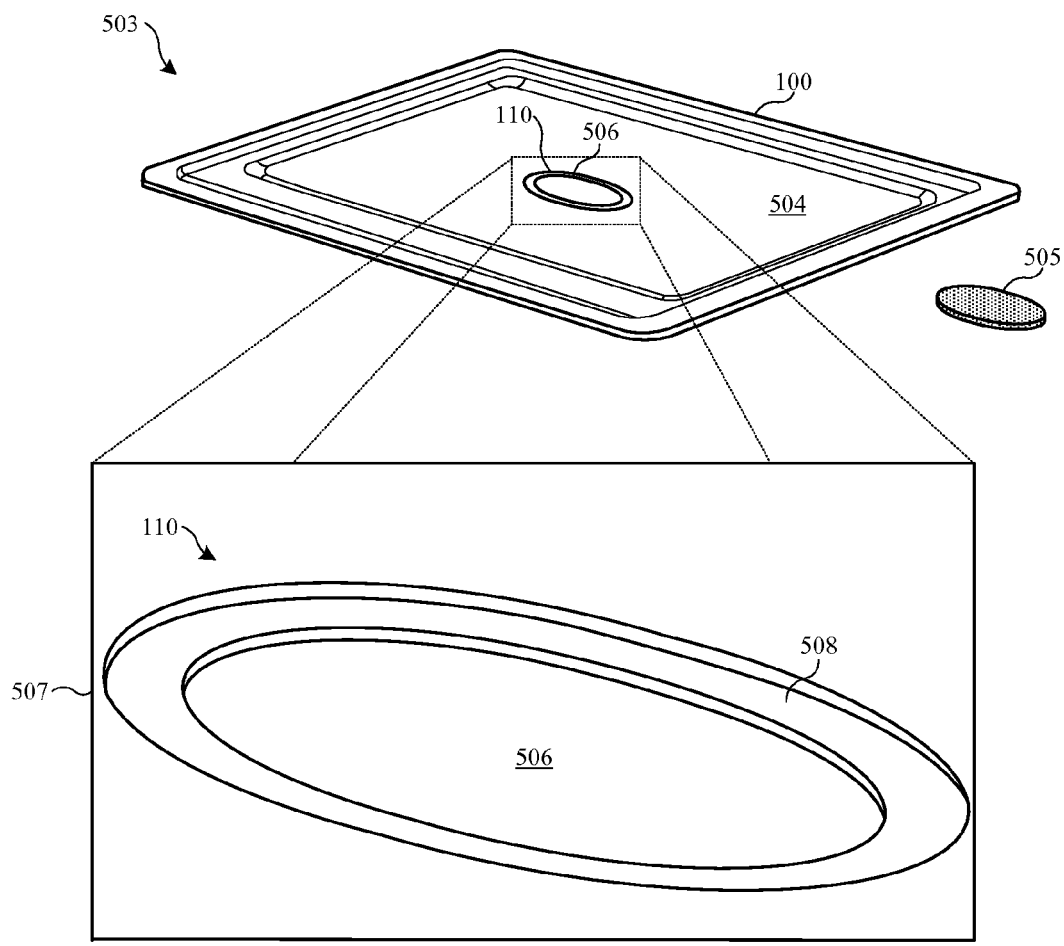

In some embodiments, the filling process is used to provide a mating surface based on a reference surface that is on a different plane that the mating surface. To illustrate, FIGS. 5A and 5B show perspective external 501 and internal 503 views, respectively, of housing section 100. External view 501 shows external surface 502, and internal view 503 shows internal surface 504 of housing section 100. Inlay region 110 of housing section 100 corresponds to a region where inlay 505 will be placed and fixed to housing section 100. Inlay region 110 is recessed with respect to internal surface 504 and includes opening 506 that allows viewing of a portion of inlay 505 from external view 501.

Inset 507 shows a close up view of inlay region 110 with recessed surface 508 that is shaped to accommodate inlay 505. In some embodiments, recessed surface 508 ideally has a shape corresponding to a shape of a surface portion of external surface 502 near opening 506, represented as reference contour 510 (or reference plane 510). This can result in less offset of inlay 505 with respect to external surface 502 once inlay 505 is positioned and fixed within opening 506. However, recessed surface 508 may not correspond with reference contour 510 due to tolerances or cutter tool mismatching used in machining processes. The extent to which the shape of recessed surface 508 differs from reference contour 510 can be determined by obtaining and comparing three-dimensional mapping data of recessed surface 508 and reference contour 510, as described above. Note that in some embodiments, recessed surface 508 ideally has a curved shape in accordance with a curved reference surface portion of external surface 502.

Figure 5C:
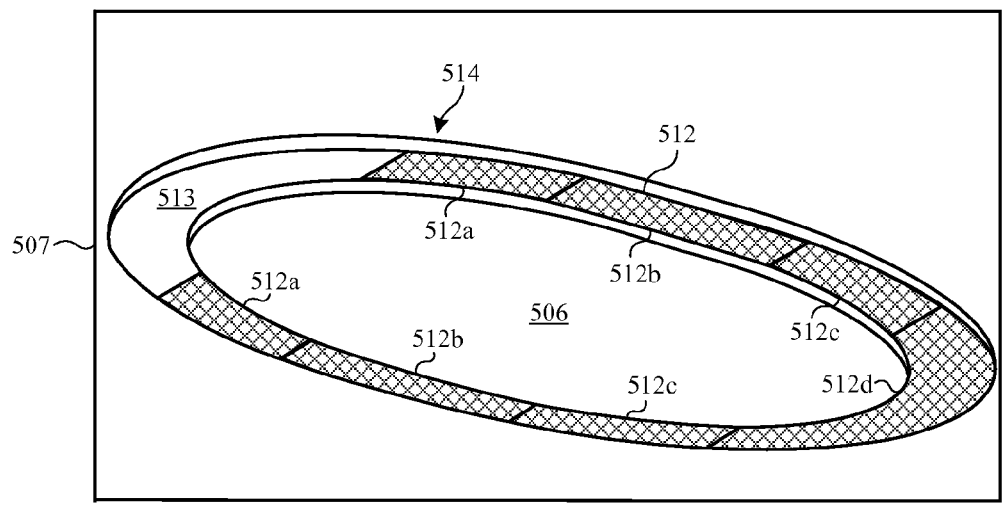

FIG. 5C shows inlay region 110 with filler material 512 deposited on portions of recessed surface 508. In particular, filler material 512 is deposited in sections 512a, 512b, 512c, 512d having varying thicknesses that result in mating surface 514 that is substantially parallel with reference contour 510. Sections 512a, 512b, 512c, 512d can each be deposited using the multilayered printing techniques described above, wherein thicker sections include more layers of ink. For example, section 512d can be thicker than section 512c, which can be thicker than section 512b, which can be thicker than section 512a. In some embodiments, portion 513 of recessed surface 508 does not have any filler material 512 deposited thereon.

Figure 5D:
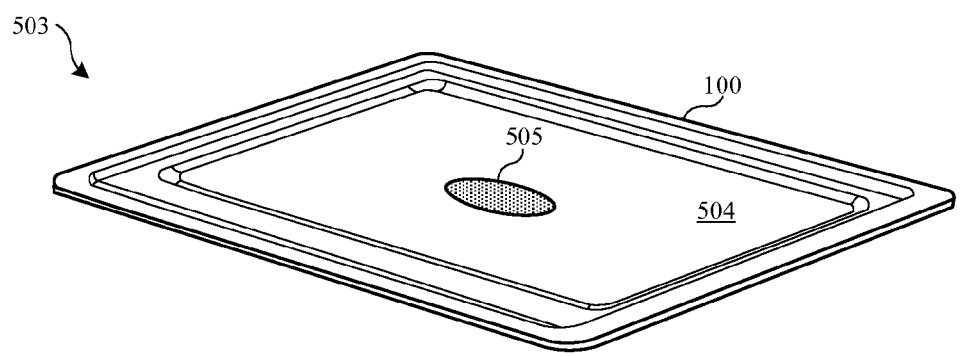
Figure 5E:
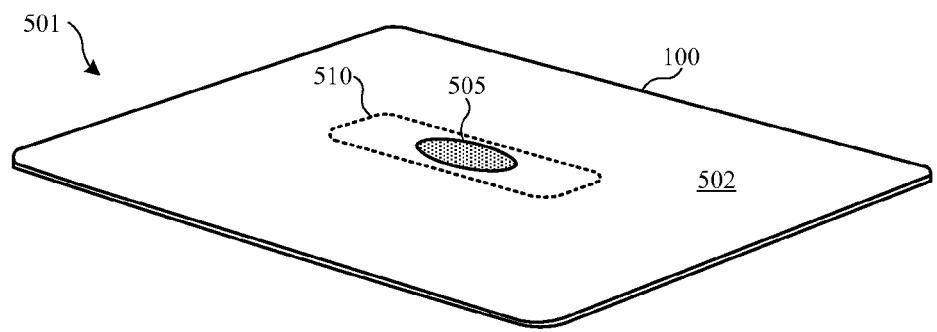

FIGS. 5D and 5E show external 501 and internal 503 views of housing section 100 after inlay 505 is positioned over filler material 512 and within opening 506. Since mating surface 514 is substantially parallel with reference contour 510, inlay 505 is substantially flush with external surface 502. That is, there is substantially no offset between a top surface of inlay 505 and external surface 502, resulting in an aesthetically appealing overall external surface 502 of housing section 100.

Figure 6:
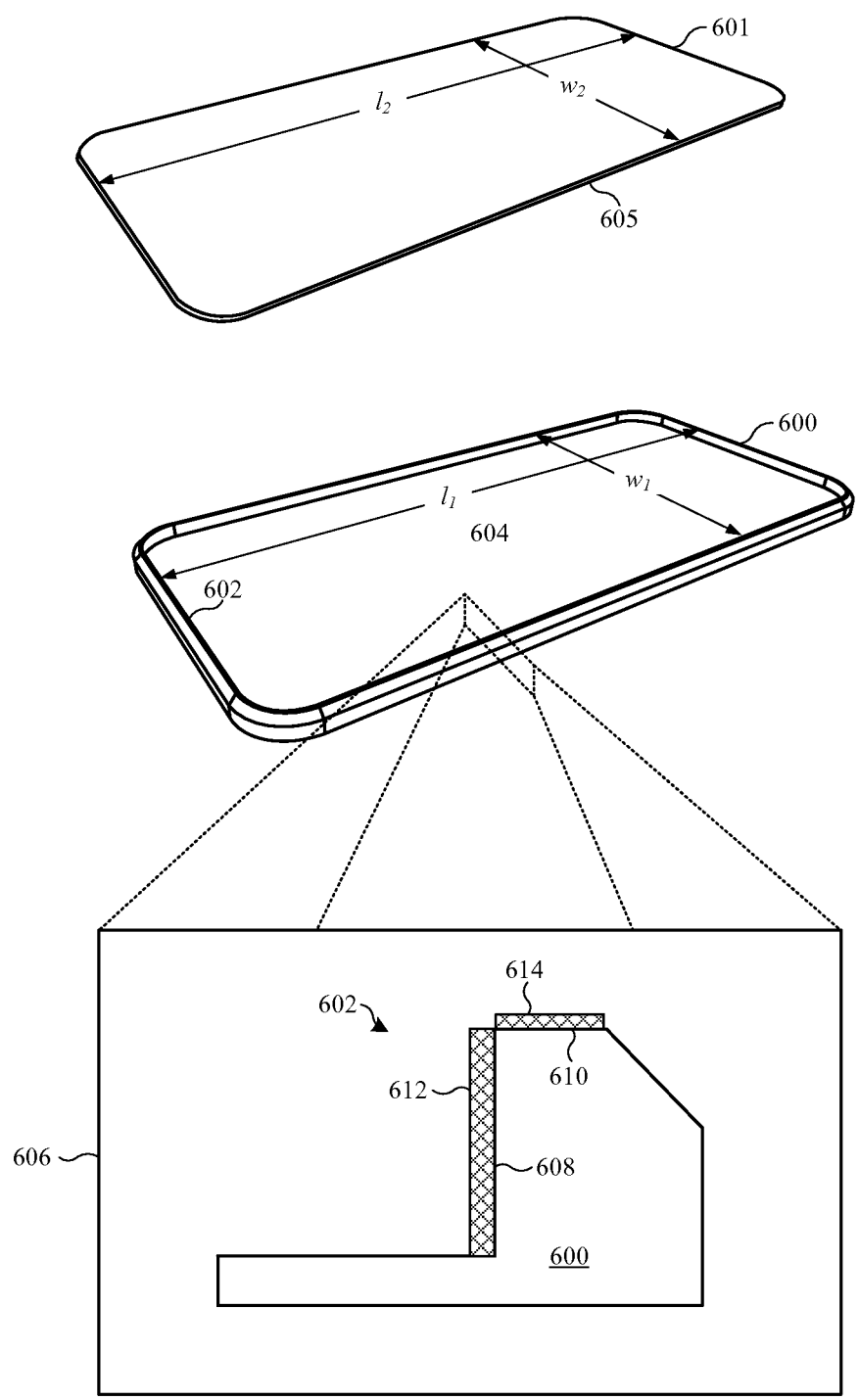
FIG. 6 shows perspective and cross section views of mateable housing sections after undergoing a surface modification process.

FIG. 6 shows another use for the surface filling techniques described herein. FIG. 6 shows a perspective view of first housing section 600 and second housing section 601, which collectively can form a housing for an electronic device. First housing section 600 includes cavity 604 that can accommodate various components, such as a display assembly. Second housing section 601 can be, for example, a cover glass that is substantially transparent to allow viewing of a display assembly housed within cavity 604. First housing section 600 includes lip portion 602 that defines a perimeter of housing section 600. Lip portion 602 can be secured to second housing section 601 using, for example, adhesive. The dimensions of lip portion 602 can be defined by length $l_1$ and width $w_1$, which should optimally be matched with corresponding length $l_2$ and width $w_2$ of second housing section 601.

One of the problems that may occur due to imperfect manufacturing processes is that length $l_1$ and width $w_1$ of lip portion 602 can vary among product lines of first housing sections 600. In addition, length $l_2$ and width $w_2$ of second housing section 601 can vary among product lines of second housing sections 601. This can cause mismatched dimensions of corresponding first housing sections 600 and second housing sections 601. For example, length $l_1$ and width $w_1$ of lip portion 602 can be substantially larger than length $l_1$ and width $w_1$ of second housing section 601. Some tolerance may be provided, for example, to make room for adhesive(s). However, too much space may cause an improper seal between first housing section 600 and second housing section 601. In these situations, first housing section 600 and/or second housing section 601 would typically be scrapped, creating waste in the manufacturing process.

One way to address this problem is to deposit a thin layer of filler material along surfaces of lip portion 602 such that second housing section 601, can properly mate with lip portion 602. For example, inset view 606 shows a cross section view of a portion of lip portion 602. As shown, lip portion 602 can be defined by first surface 608 and adjacent non-parallel second surface 610. First filler material 612 can be deposited on portions of first surface 608 so as to shorten width $w_1$ and/or length $l_1$ of lip portion 602. First filler material 612 can be deposited in multiple thin layers, as described above, until first filler material 612 achieves a desired thickness. In this way, the dimension of lip portion 602 can be modified to match with a corresponding mating surface 605 of second housing section 601. In some embodiments, second filler material 614 is also deposited on second surface 610 of lip portion 602. Second filler material 614 can be used to compensate for any unevenness of second surface 610 with respect to a second portion of mating surface 605 of second housing section 601. In this way, the methods can add thickness to internal vertical and horizontal surfaces of first housing section 600.

Dimensions, such as length $l_1$ and width $w_1$ of lip portion 602 and length $l_2$ and width $w_2$ of second housing section 601 can be obtained using three-dimensional mapping techniques described above. For example, a first dimensional mapping operation can be used to collect length $l_1$ and width $w_1$ of lip portion 602 and a second dimensional mapping operation can be used to collect length $l_2$ and width $w_2$ of second housing section 601. The data from the first and second dimensional mapping operations can be saved in a database and compared and used to determine a desired thickness of first filler material 612. Similar comparisons can be used to determine a desired thickness of second filler material 614. In some embodiments, first filler material 612 and second filler material 614 are each substantially uniform in thickness. In other embodiments, one or both of first filler material 612 and second filler material 614 each have varied thickness to compensate for any non-planarity of first surface 608 and/or second surface 610.

Figure 7A:
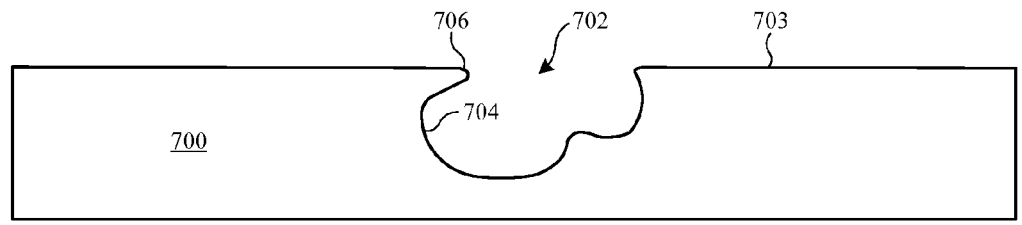
FIGS. 7A-7C show cross section views of a feature undergoing a feature modification process and a surface modification process.
Figure 7B:
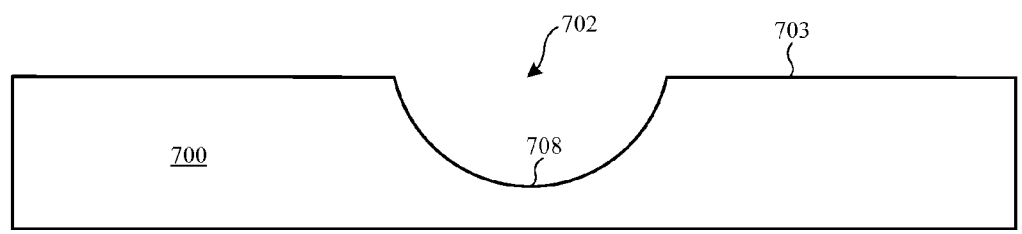
Figure 7C:
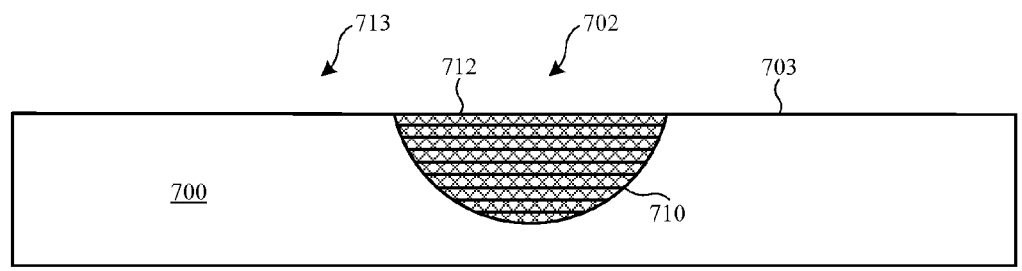

FIGS. 7A-7C show cross section views of substrate 700 undergoing a surface filling process in accordance with other embodiments. In some embodiments, substrate 700 is part of an enclosure, such as for an electronic device. Mating surface 713 can be joined with another substrate using adhesive, fasteners, or both. In this way, substrate 700 can be referred to as a primary or base substrate that is configured to join or couple with a secondary or auxiliary substrate. FIG. 7A shows recessed feature 702, which can impede good mating with the corresponding substrate. Therefore, a filling process can be used to fill recessed feature 702 to be level with external surface 703. However, recessed feature 702 includes undercut surface 704, which corresponds to a surface within recessed feature that is obscured by overhang portion 706. Overhang portion 706 can block undercut surface from being directly deposited or printed on with filler material. Thus, the filler material may not reach and deposit on undercut surface 704, resulting in incomplete filling of recessed feature 702.

One way to address this problem is by using a filler material that has a low viscosity so that the filler material can flow and distribute itself along all surfaces within recessed feature 702. If the filler material is viscous enough, it can flow onto undercut surface 704 while in liquid form and then harden into a solid state, thereby allowing full coverage of surfaces within recessed feature 702. The filler material can be applied in layers, as described above, with each layer being allowed to flow and distribute within recessed feature 702. In some cases, however, recessed feature 702 may still not be adequately filled due to the unusual shape of recessed feature 702. In this way, recessed feature 702 can be deemed not unrepairable or cannot by brought into conformance by depositing filler material alone.

In some embodiments, the dimensions of recessed feature 702 are modified so that a filler material can more easily access all surfaces within recessed feature 702. For example, FIG. 7B shows recessed feature 702 after a feature modification process. As shown, overhang portion 706 is removed, thereby providing clear access to surface 708 within recessed feature 702 and rendering previously unrepairable recessed feature 702 as reparable. This modification can be accomplished using any suitable method, depending, in part, on the material of substrate 700 and the size of recessed feature 702. For example, a laser ablation process, a machining process and/or a chemical etching process can be used. In some embodiments where recessed feature 702 is very small, a laser ablation process is preferred since laser ablation can generally provide accurate control of amount and location of material removal.

FIG. 7C shows recessed feature 702 after filler material 710 is deposited within recessed feature 702. In some embodiments, a printing process is used, as described above, such that filler material 710 can be deposited precisely within recessed feature 702 and with controlled amounts. In some embodiments, multiple layers of ink are sequentially deposited to form filler material 710. In some embodiments, filler material 710 has a low viscosity such that it can easily conform to the shape of recessed feature 702 and then harden to a rigid material. Filler material 710 can be deposited such that exposed surface 712 of filler material 710 is substantially coplanar, or flush, with external surface 703 of substrate 700, forming a substantially planar mating surface 713. Note that in some embodiments, mating surface 713 is curved to match with a corresponding curved surface of a mating surface of a second substrate.

Note that feature modification process used on recessed feature 702 can also be used to modify the shape of a protruding feature. For example, returning to FIGS. 3A-3E, it may be determined that bump 106 protrudes a distance p too high to provide a sufficiently planar mating surface 304, thereby deemed not repairable solely by depositing filler material. In these cases, the shape of bump 106 can be modified to decrease distance p such that filler material 302 can adequately form a substantially planar mating surface 304. In some embodiments, bump 106 is transformed into a recessed feature that can then be filled with filler material.

Figure 8:
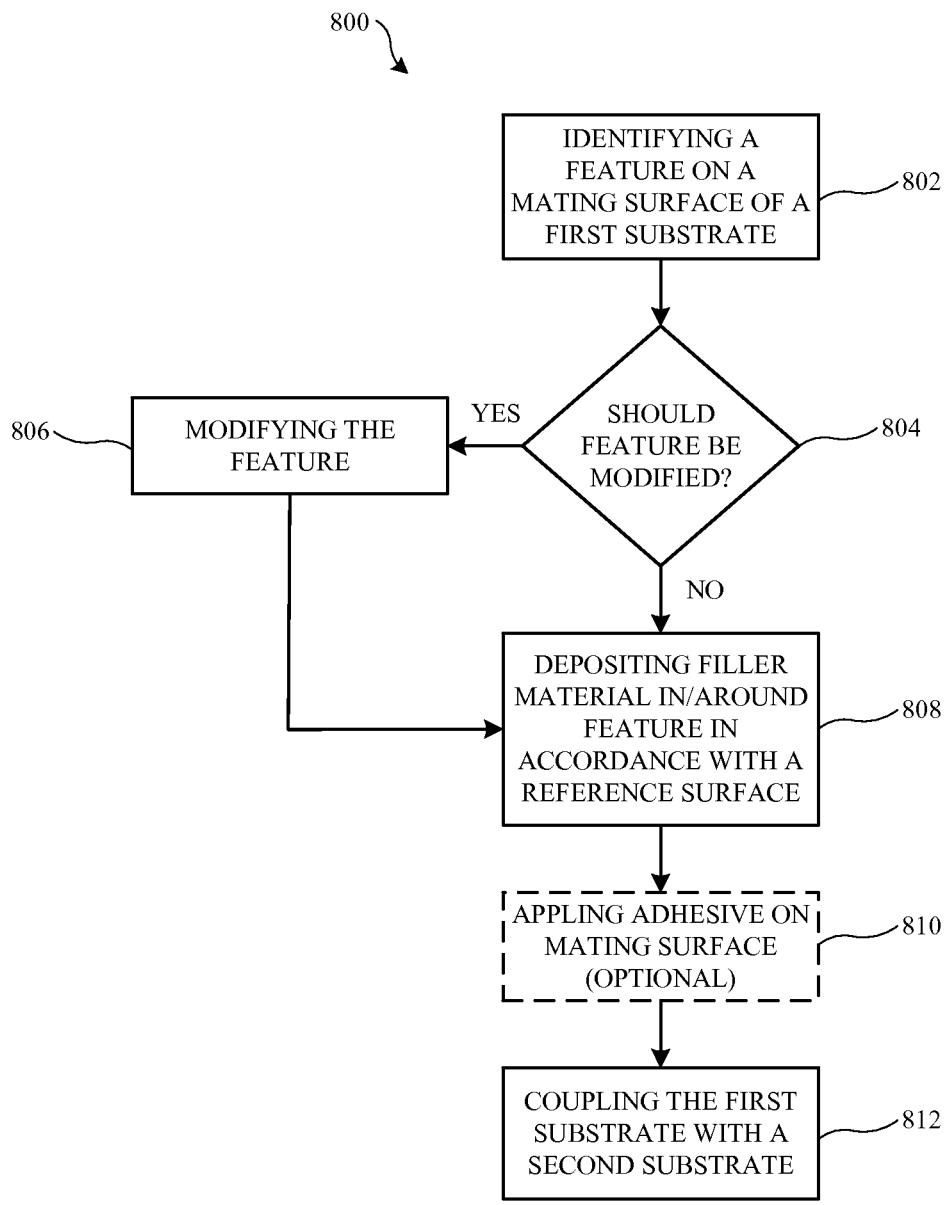
FIG. 8 shows a flowchart illustrating a method of modifying a surface in accordance with some embodiments.

FIG. 8 shows flowchart 800 indicating a method for modifying a surface of a substrate, in accordance with some embodiments. The substrate can be a first substrate arranged to couple with a second substrate. The first and second substrates can be made of any suitable material including, but not limited to, one or more of metal, plastic, glass, and ceramic. In some embodiments, the first substrate is part of a first housing section that is configured to couple with a second housing section to form a housing for an electronic device. In a particular embodiment, the first and second housing sections are made of metal, such as an aluminum alloy.

At 802, a feature is identified on a mating surface of the first substrate. The mating surface can correspond to a surface of the first substrate that is coupled to the second substrate, either directly or via one or more adhesive layers. The feature may be in the form of a recess (e.g., divot, scratch, dent, channel) or a protrusion (e.g., bump, offset portion, ledge) that prevents intimate contact between the first substrate and the second substrate. The feature may be a defect that is unintentionally formed during one or more manufacturing operation, or may be intentionally formed on the first substrate.

At 804, a determination is made as to whether the feature should be modified. The feature may have a shape or contour that is not conducive to depositing a filler material on or around the feature. For example, the feature may include an overhang that blocks deposition of filler material. This blocking can create voids between the filler material and the first substrate that decreases a bond strength of the filler material with the first substrate. In some embodiments, the feature is too small to be deposited with filler material. In some embodiments where the feature is a protruding feature, the protruding feature may protrude a distance too far from the first substrate to provide adequate smoothing using filler material.

If it is determined that the feature should be modified, at 806 the feature is modified using a feature modification process. This process can include increasing the size of a recessed feature so that filler material can adequately fill or more easily fill the recessed feature. If the feature includes an overhang that impeded depositing of filler material, the feature modification process can remove the overhang, allowing access to all surfaces within the feature. If the feature is a protruding feature that protrudes too far from the first substrate, material from the protruding feature can be removed to shorten the protruding feature. In some cases, enough material is removed from the protruding feature to form a recessed feature. The feature modification process can include, but is not limited to, one or more machining, laser ablation and/or etching techniques.

At 808, a filler material is deposited in and/or around the feature in accordance with a reference surface. The filler material can be made of any suitable material and can be deposited using any suitable technique. In some embodiments, the filler material is deposited using a printing technique where the filler material is deposited in very small droplets with the direction and placement of droplets accurately controlled by a printer, such as an ink jet printer. In some embodiments, a viscosity of the filler material is sufficiently low to allow the filler material to spread and conform to a shape of the feature. The filler material can then be allowed to harden to a final shape that is conformal with the feature. In some embodiments where the filler material is UV light reactive, UV light can be used to harden or accelerate hardening of the filler material. In some embodiments, the filler material is chosen to have a higher viscosity such that the filler material does not spread too much and overflow onto adjacent surfaces of the substrate. In some embodiments, the filler material is deposited in multiple layers until a final thickness of filler material is achieved. The multiple layer depositing can allow for accurately achieving a final desired thickness of filler material. In some cases, each layer of filler material is sequentially be allowed to conform to a shape of a portion of the feature and then hardened.

The reference surface can refer to a surface having a two-dimensional or three-dimensional shape and/or orientation of a desired final shape of the mating surface. The reference surface can be a substantially planar surface or a non-planar surface, such as a curved surface. In some embodiments, the reference surface is adjacent the mating surface such that when the filler material is deposited, the filler material makes the mating surface substantially flush with the adjacent reference surface. In some embodiments, the reference surface is a planar surface that is coplanar with another non-contiguous mating surface of the substrate. In some embodiments, the reference surface corresponds to a three-dimensional shape of a corresponding mating surface of the second substrate. If the feature is a recessed feature, the filler material can fill in the recessed feature and build up the recessed feature to a desired height. If the feature is a protruding feature, the filler material can be deposited around the feature to smooth out and make the mating surface take on a final desired shape, such as a substantially planar shape.

In some embodiments, three-dimensional data of the reference surface is obtained by imaging, scanning and/or mapping techniques. In some embodiments, an imaging device is used to optically scan and collect images of the reference surface. In some embodiments, a contact-based technique, such as surface profilometry, is used. In some embodiments, a laser scanning technique, such as laser dot scanning, is used. In some embodiments, a combination of imaging, laser scanning and/or contact-based techniques are used. In some embodiments, the three-dimensional data is computer-simulated data.

At 810, an adhesive is optionally applied onto the mating surface. The adhesive can be a layer of adhesive material, such as a UV activated liquid adhesive or adhesive tape. In some embodiments, multiple layers of adhesive are used. The thickness of the adhesive can be optimally small so as to take up as little space as possible, yet provide good bonding performance. The thickness of the adhesive will depend on the type of adhesive(s) and the material of the first and second substrates.

At 812, the first substrate is coupled at the mating surface with the second substrate. If an adhesive is used, the first substrate is coupled with the second substrate via the adhesive. In some embodiments, the first substrate is coupled with the second substrate with one or more fasteners, such as screws, bolts, etc. In some embodiments, a combination of adhesive and fastener(s) are used. The filler material on the mating surface can compensate for any pre-formed defects on the mating surface and prevent a gap associated with the feature from forming between the first substrate and the second substrate.

Figure 9:
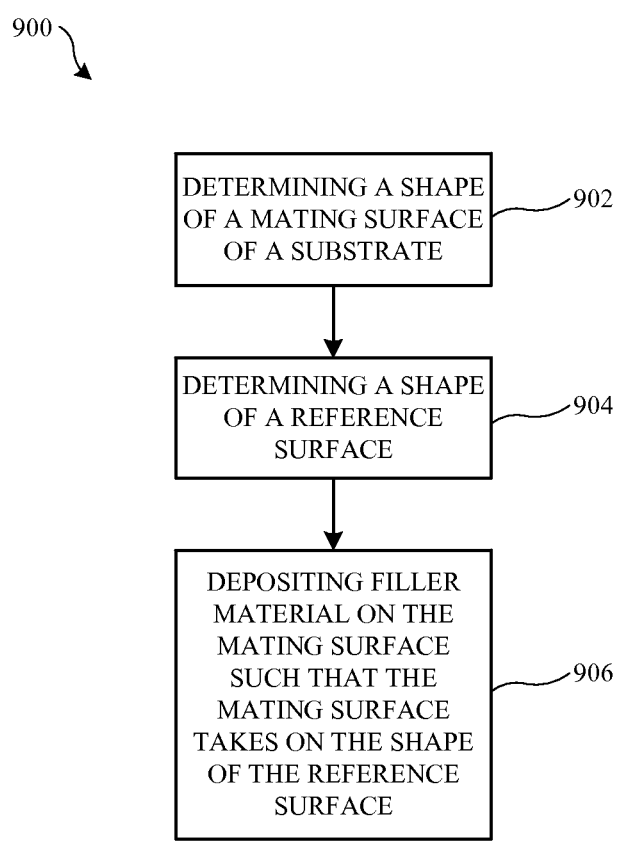
FIG. 9 shows a flowchart illustrating another method of modifying a surface in accordance with some embodiments.

FIG. 9 shows flowchart 900 indicating another method for modifying a surface of a substrate, in accordance with some embodiments. At 902, a shape of a mating surface is determined. The mating surface can correspond to a surface where another substrate, such as a second housing section, an inlay or another type of part, is mounted or coupled to the substrate. The shape can be a two-dimensional shape or a three-dimensional shape of the mating surface. The shape can be determined using any suitable method, including obtaining data using non-contact methods and/or contact methods. Non-contact methods may include imaging and/or laser scanning techniques. Contact methods can include profilometry or other techniques. In some cases, a combination of non-contact and contact methods is used. A computing device can store data corresponding to the shape of the mating surface.

At 904, a shape of a reference surface is determined. The reference surface has a shape that corresponds to an ideal shape of the mating surface. The reference surface can have any desirable shape, such as a planar shape or a curved shape. The reference surface can correspond to shape of another surface portion of the substrate. For example, the reference surface can correspond to an adjacent or non-adjacent portion of the mating surface. In some embodiments, the shape of the reference surface corresponds to a surface of the substrate opposite the mating surface, such as inlays as described above with reference FIGS. 5A-5E. The shape of the reference surface can be obtained using any suitable method such as imaging, laser scanning and/or profilometry. In some embodiments, the shape of the reference surface is obtained the same way as obtaining the shape of the mating surface. In some embodiments, the shape of the reference surface determined by simulated data—that is, data obtained by computational methods.

At 906, filler material is deposited on the mating surface such that the mating surface takes on the shape of the reference surface. This can be accomplished by determining the difference between the shape of the reference surface and the shape of the mating surface, then depositing the filler material on the mating surface at appropriate locations and in appropriate amounts until the mating surface attains the shape of the reference surface. In some embodiments, the mating surface has a distinctive feature, such as a recessed feature or a protruding feature, which is deposited on and/or around with the filler material. In some embodiments, the mating surface is sloped or otherwise misshaped in comparison to the reference surface. In some embodiments, sections of filler material having different thicknesses are deposited on the mating surface. After the filler material is deposited and the mating surface takes on the shape of the reference surface, the mating surface is ready to be coupled with another substrate, either directly or using one or more adhesives.

Figure 10:
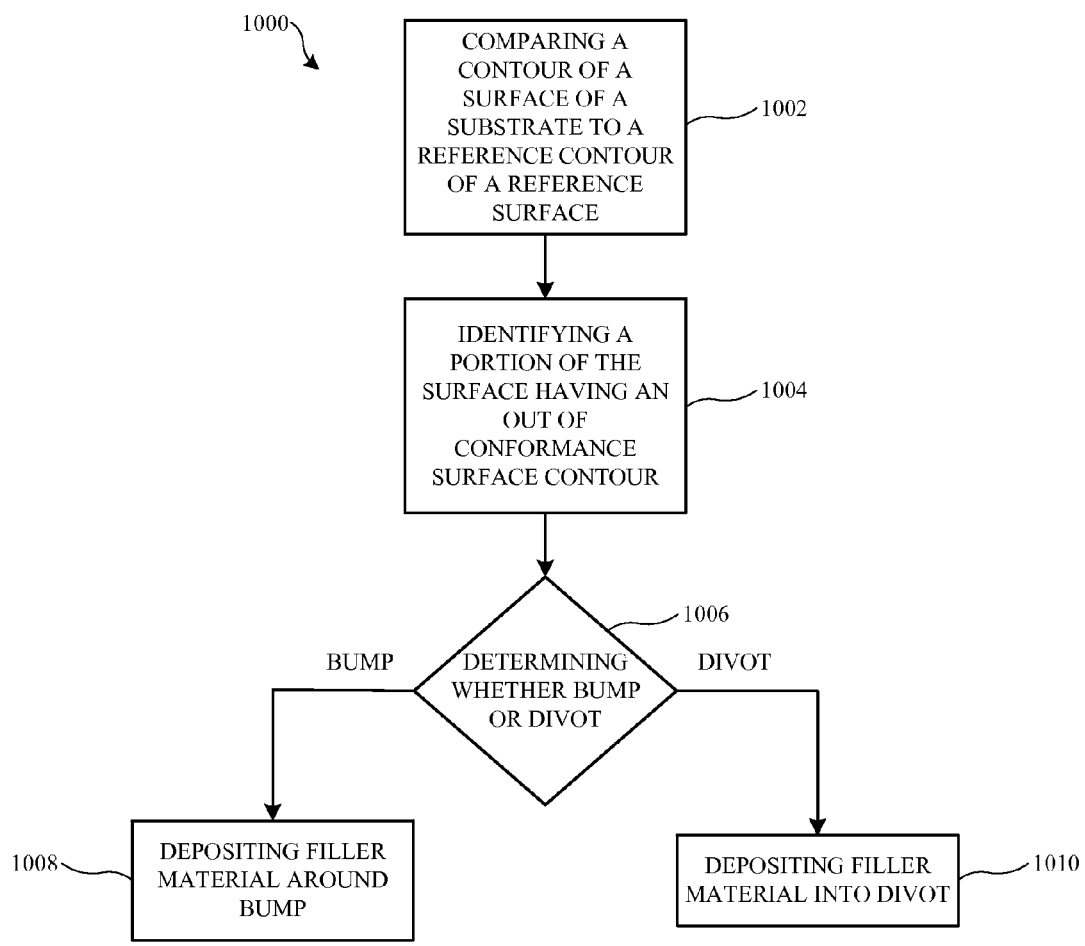
FIG. 10 shows a flowchart illustrating a further method of modifying a surface in accordance with some embodiments.

FIG. 10 shows flowchart 1000 indicating a further method for adjusting a surface of a substrate. The surface of the substrate can be a mating surface that is to be joined or coupled with another substrate. At 1002, a contour of the surface is compared to a contour of a reference surface. The reference surface can be on the same plane of the surface or on a different plane that the surface. The reference contour can be a planar or non-planar (e.g., curved).

At 1004, a portion of the surface can be identified as having a corresponding surface contour that is out of conformance with respect to the reference contour based upon the comparing. For example, the portion of the surface can be have include a bump that protrudes a distance beyond a predetermined threshold value, or a divot or recess that recesses a distance beyond a predetermined threshold value. At 1006, it is determined whether the portion of the surface includes a bump or divot. The portion of the surface can be characterized as a bump when the corresponding surface contour is proud of the reference contour and a divot otherwise.

At 1008, if it is determined that the portion of the surface has a bump, the corresponding surface contour is brought into conformance by depositing filler material around the bump. In some cases, some of the filler material is also deposited on top of the bump. At 1010, if it is determined that the portion of the surface has a divot, the corresponding surface contour is brought into conformance by depositing filler material within divot.

Figure 11:
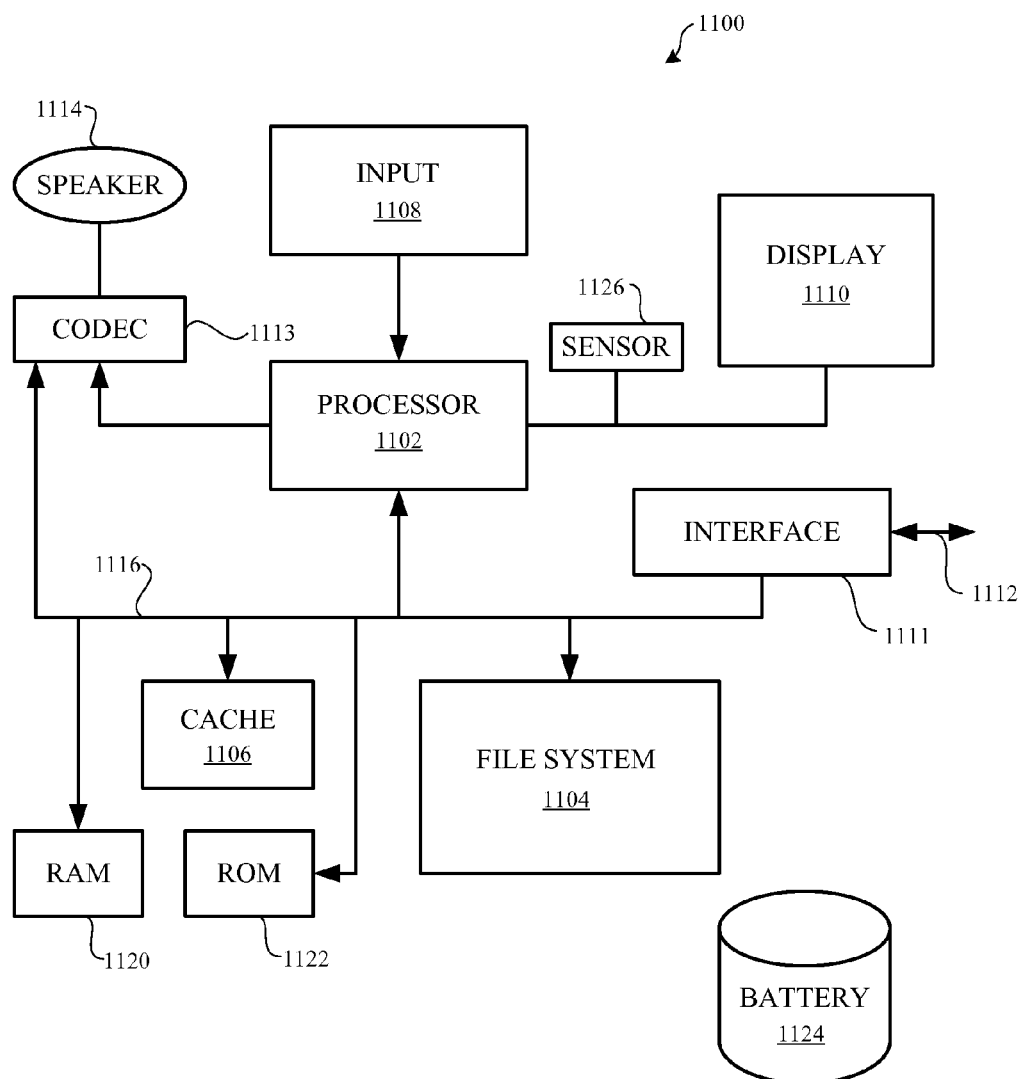
FIG. 11 shows a block diagram of an electronic system suitable for use with some described embodiments.

FIG. 11 is a block diagram of electronic system 1100 suitable for controlling some aspects of the depositing processes described above. Electronic system 1100 can represent a computing system in conjunction with one or more of the surface inspecting systems described above (e.g., optical, profilometry, and/or laser scanning systems). Electronic system 1100 includes processor 1102 that pertains to a microprocessor or controller for controlling the overall operation of electronic system 1100. Electronic system 1100 contains instruction data pertaining to instructions in a file system 1104 and cache 1106. File system 1104 is, typically, a storage disk or multiple storage disks. File system 1104 typically provides high capacity storage capability for electronic system 1100. However, since the access time to file system 1104 can be relatively slow, electronic system 1100 can also include cache 1106. Cache 1106 can be, for example, Random-Access Memory (RAM) provided by semiconductor memory. The relative access time to cache 1106 can be substantially shorter than for file system 1104. However, cache 1106 may not have the large storage capacity of file system 1104. Further, file system 1104, when active, can consume more power than cache 1106. The power consumption can be a concern when electronic system 1100 is a portable device that is powered by battery 1124. Electronic system 1100 can also include RAM 1120 and Read-Only Memory (ROM) 1122. ROM 1122 can store programs, utilities or processes to be executed in a non-volatile manner. RAM 1120 can provide volatile data storage, such as for cache 1106.

Electronic system 1100 can also include user input device 1108 that allows a user of electronic system 1100 to interact with electronic system 1100. User input device 1108 can take a variety of forms, such as a button, keypad, dial, touch screen, audio input interface, visual/image capture input interface, input in the form of sensor data, etc. Still further, electronic system 1100 can include display 1110 (e.g., screen display) that can be controlled by processor 1102 to display information to the user. In some embodiments, display 1110 provides data or images collected from the inspecting system. Data bus 1116 can facilitate data transfer among at least file system 1104, cache 1106, processor 1102, and coder/decoder (CODEC) 1113. CODEC 1113 can be used to decode and play multiple media items from file system 1104 that can correspond to certain activities taking place during a particular process. Processor 1102, upon a certain event occurring, supplies media data (e.g., audio file) for a particular media item to CODEC 1113. CODEC 1113 can then produce analog output signals for speaker 1114. Speaker 1114 can be a speaker internal to electronic system 1100 or external to electronic system 1100. For example, headphones or earphones that connect to the electronic system 1100 would be considered an external speaker.

Electronic system 1100 can also include network/bus interface 1111 that couples to data link 1112. Data link 1112 can allow electronic system 1100 to couple to a host computer or to accessory devices. Data link 1112 can be provided over a wired connection or a wireless connection. In the case of a wireless connection, network/bus interface 1111 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1126 can take the form of circuitry for detecting any number of stimuli. For example, sensor 1126 can include any number of sensors for monitoring a surface characterization operation such as a Hall effect sensor responsive to external magnetic field, an audio sensor, a light sensor such as a photometer, etc.

The various aspects, embodiments, implementations or features of the described embodiments can be used separately or in any combination. Various aspects of the described embodiments can be implemented by software, hardware or a combination of software and hardware. The described embodiments can also be embodied as computer readable code on a non-transitory computer readable medium for controlling manufacturing operations or as computer readable code on a non-transitory computer readable medium for controlling a manufacturing line. The non-transitory computer readable medium is any data storage device that can store data, which can thereafter be read by a computer system. Examples of the non-transitory computer readable medium include read-only memory, random-access memory, CD-ROMs, DVDs, magnetic tape, optical data storage devices, and carrier waves. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method of joining a cover glass to a housing of an electronic device, the method comprising:
   identifying a target portion of a mating surface of the housing as out of conformance with respect to a reference surface of the mating surface of the housing and having:
   (1) a bump when the target portion of the mating surface is proud of the reference surface, otherwise
   (2) a divot; and
   modifying the target portion of the mating surface by:
   (1) depositing a first amount of a curable ink in a region around the bump, otherwise,
   (2) depositing a second amount of the curable ink into the divot,
   thereby forming a modified target portion of the mating surface in conformance with the reference surface;
   applying an adhesive layer over the reference surface and the modified target portion of the mating surface; and
   positioning the cover glass on the adhesive layer, thereby joining the cover glass to the housing.

2. The method of claim 1, further comprising changing a shape of the divot prior to depositing the second amount of the curable ink into the divot.

3. The method of claim 2, wherein changing the shape of the divot comprises laser ablating the divot.

4. The method of claim 1, wherein the housing is further secured to the cover glass with a fastener.

5. The method of claim 1, wherein:
   the reference surface is adjacent the target portion of the mating surface;
   the target portion of the mating surface includes the bump having a top projecting 15 microns or less above the reference surface; and
   the first amount of the curable ink provides a transition in surface contour between the reference surface and the top of the bump.

6. The method of claim 1, wherein the curable ink comprises a UV sensitive material.

7. The method of claim 1, wherein the bump or divot is an artifact of one or more machining processes.

8. The method of claim 1, wherein depositing the first amount of the curable ink or the second amount of the curable ink comprises sequentially printing on multiple layers of the curable ink in the region around the bump or into the divot.

9. The method of claim 8, wherein sequentially printing on the multiple layers of the curable ink comprises allowing each of the multiple layers of the curable ink to conform to a portion of the bump or divot.

10. The method of claim 1, wherein the target portion of the mating surface is a first target portion of the mating surface and the method further comprises:
   identifying a second target portion of the mating surface as out of conformance with respect to the reference surface and having a slope; and
   bringing the second target portion into conformance by depositing a third amount of the curable ink on the second target portion in a stepwise fashion in accordance with the reference surface.

11. The method of claim 1, wherein the adhesive layer wets the reference surface and the modified target portion of the mating surface.

12. The method of claim 11, wherein modifying the target portion of the mating surface prevents a gap associated with the bump or divot from forming between the housing and the cover glass.

13. A method of coupling an inlay to a housing for an electronic device, comprising:
   depositing a curable ink on an internal surface of the housing to at least partially define a mating surface that is parallel to an external surface of the housing, the internal surface surrounding an opening in the housing and being non-parallel to the external surface of the housing;
   curing the curable ink;
   applying an adhesive to the mating surface; and
   positioning the inlay on the adhesive and at least partially in the opening such that an external surface of the inlay is substantially flush with the external surface of the housing.

14. The method of claim 13, wherein the mating surface is substantially planar.

15. The method of claim 13, wherein the opening defines a continuously curved shape.

16. The method of claim 13, wherein depositing the curable ink comprises printing multiple sections of the curable ink on the internal surface.

17. The method of claim 16, wherein at least two of the multiple sections of the curable ink have different thicknesses.

18. The method of claim 13, wherein:
   the internal surface of the housing is a first internal surface; and
   the first internal surface is recessed with respect to a second internal surface surrounding the first internal surface.

19. A method of modifying a housing, the housing having a perimeter defined by a lip portion defining dimensions of an opening for accommodating a cover glass, the method comprising:
   obtaining dimensional data related to the lip portion;
   obtaining dimensional data related to the cover glass;
   depositing an ultraviolet (UV)-curable ink on a first surface of the lip portion;
   exposing the UV-curable ink to UV light, thereby curing the UV-curable ink and decreasing the dimensions of the opening in accordance with the dimensional data of the cover glass;
   applying an adhesive layer to a second surface of the lip portion; and
   positioning the cover glass on the adhesive layer, thereby bonding the cover glass to the lip portion.

20. The method of claim 19, wherein the UV-curable ink is a first-UV-curable ink and-the method further comprises:
   depositing a second UV-curable ink on the second surface so as to form a substantially planar mating surface configured to bond with a substantially planar surface of the cover glass.

* * * * *